G. E. KIPP.
DETACHABLE WHEEL RIM.
APPLICATION FILED APR. 30, 1910.
972,541.
Patented Oct. 11, 1910.
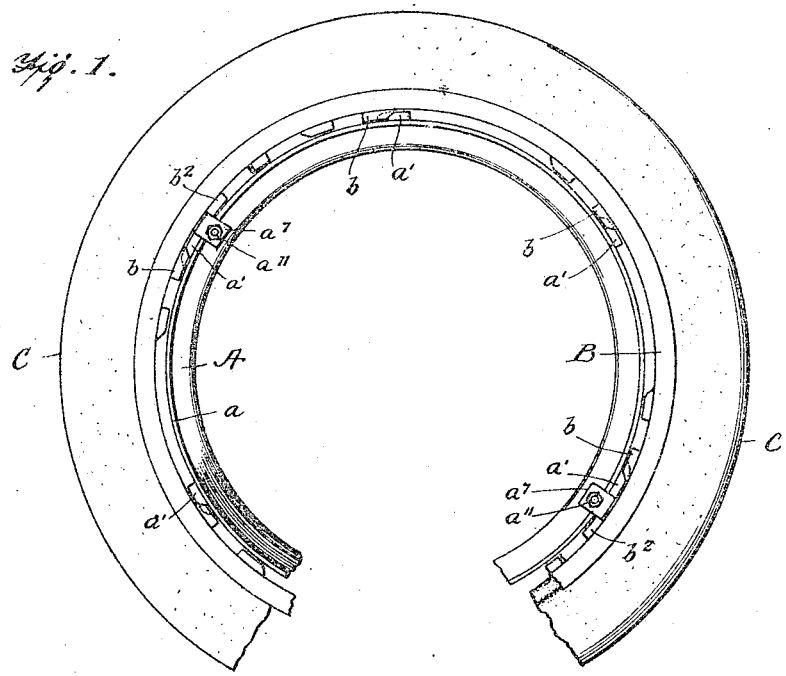
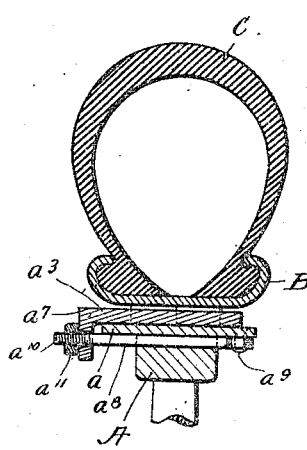
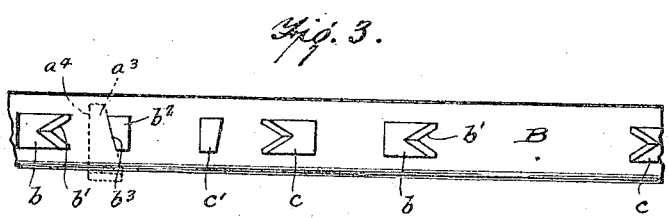
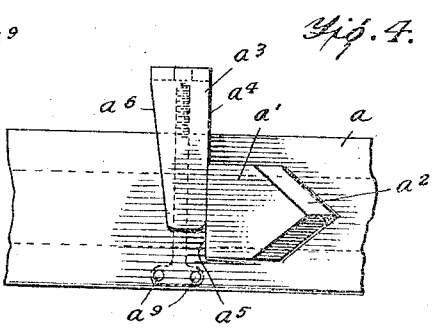
WITNESSES:
INVENTOR
George E. Kipp
BY
ATTORNEY

UNITED STATES PATENT OFFICE.

GEORGE E. KIPP, OF NIVERVILLE, NEW YORK.

DETACHABLE WHEEL-RIM.

972,541.   Specification of Letters Patent.   Patented Oct. 11, 1910.

Application filed April 30, 1910. Serial No. 558,653.

*To all whom it may concern:*

Be it known that I, GEORGE E. KIPP, a citizen of the United States, residing at Niverville, in the county of Columbia and State of New York, have invented new and useful Improvements in Detachable Wheel-Rims, of which the following is a specification.

The object of this invention is to provide an outer, tire-carrying rim for wheels, especially automobile wheels, which shall present the following, among other, salient and important advantages, namely: 1. A detachable rim which shall be susceptible of easy and quick detachment from and attachment to a wheel, with the minimum loss of time and delay and the consumption of a minimum amount of exertion; 2. A detachable rim which, by reason of its simplicity, may be detached from and attached to a wheel by the merest novice or tyro, dispensing with skilled labor; 3. A detachable rim which, when positioned upon the wheel, will not be pulled out of true by the strain incident to the traveling automobile; and 4. A detachable rim which may be manufactured and sold at a moderate cost.

With these expressly stated, fundamental objects in view, and also other objects of specific improvement appearing as the specification proceeds, my invention comprises the novel construction, combination and arrangement of parts, as hereinafter fully described in the specification, summed up in the claims, and illustrated in the drawing.

In the drawing, which shows one embodiment of my invention capable of carrying out the underlying principles thereof, and in which like letters of reference indicate corresponding parts throughout the several views: Figure 1 is a side elevation, partly broken away, of a wheel (the spokes being omitted), showing my improvements applied thereto; Fig. 2 is a transverse section through the wheel; Fig. 3 is a fragmentary detail view, looking down upon the inner or under face of the detachable outer rim; and Fig. 4 is a fragmentary detail view, looking down upon the upper face of the inner rim carried by the felly.

Referring, now, in detail to the drawing: A designates a felly carrying an inner rim $a$. Carried by said rim are blocks $a'$, which are formed, at one end thereof, with a straight side $a^5$ and, at the other end, are provided with V-shaped noses $a^2$, the two walls of said V-shaped noses being, preferably beveled, as shown most clearly in Fig. 4 of the drawing. I prefer to utilize six of these blocks $a'$, equidistantly spaced apart, although a greater or a less number may be employed, as desired.

B designates a detachable, outer rim, carrying a tire C. This detachable rim B carries, in its inner or under surface, blocks $b$, which are, at one end thereof, provided with a V-shaped incut or notch, as at $b'$, the walls of said incut being preferably beveled. The blocks $b$ on the rim B are so arranged relative to the blocks $a'$ on the rim $a$ that they may be brought into engagement (in a manner and by the means hereinafter appearing) with the blocks $a'$, the V-shaped ends or noses $a^2$ of the blocks $a'$ extending into the V-shaped incuts or notches $b'$, with a wedging and locking action.

$a^3$ designates a wedge-key, which, as shown, is provided with one straight side adapted to engage the straight end $a^5$ of the block $a'$, and with one inclined side $a^6$ adapted to engage the similarly inclined side $b^3$ of abutments $b^2$ carried by the inner or under surface of the outer rim B, and positioned near one of the blocks $b$. The wedge-key is also provided with a lateral, downturned flange or head $a^7$. Preferably, two of these wedge-keys $a^3$ are provided and, advantageously, they are disposed at diametrically opposite points on the wheel, as shown clearly in Fig. 1. As two wedge-keys are preferably used, two abutments $b^2$ (as shown in Fig. 1) must, of course, be employed, one to coöperate with each key.

Though different methods and means for locking the wedge-keys $a^3$ in position will readily suggest themselves, I have, in this instance, shown, as an example of one means, a bolt $a^8$ extending transversely through the felly A, and which may be secured in position in any manner, as by being riveted at one end to the inner rim $a$, as shown at $a^9$. The other end of the bolt $a^8$ is threaded, as at $a^{10}$, and projects through the head or flange $a^7$ of the wedge-key $a^3$ and carries a nut $a^{11}$ (all as clearly shown in Figs. 1, 2 and 4).

The operation of the device is as follows: In placing a detachable rim B on a wheel, the said rim is slipped onto the wheel in such position that the blocks $a'$ on the inner rim $a$ lie between the blocks $b$ and the abutments $b^2$; then the wedge-keys $a^3$ are thrust in between the abutments $b^2$ and the blocks $a'$ and the nuts $a^{11}$ tightened,—the inclined side $a^6$ of the wedge-key $a^3$ wedging against the inclined side $b^3$ of the abutment $b^2$ and the straight side $a^4$ bearing against the straight end $a^5$ of the block $a'$ carried by the inner rim $a$, whereby the outer rim B is moved or revolved slightly to cause the V-shaped ends or noses $a^2$ of the blocks $a'$ to wedge firmly in the V-shaped notches of the blocks $b$. When it is desired to remove the detachable outer rim B, to replace it by another, all that has to be done is to remove the nuts $a^{11}$ and then take out the wedge-keys $a^3$, when the outer rim may be turned or revolved slightly to free the blocks $a'$ from locking engagement with the blocks $b$, and the outer rim then slid off from the wheel. It will be understood, of course, that the nuts $a^{11}$, whether the automobile-wheel be on the right or the left-hand side of the automobile, are on the outer side of the wheel, so that they may be easily reached.

In order that the detachable rim B may be placed on a wheel which is on either the right or left hand side of the automobile, the under or inner face of the outer rim B carries, intermediate of the six blocks $b'$ and equidistantly spaced apart, additional blocks $c$ (preferably six in number) and two additional abutments $c'$ (only one being shown in the drawing), these additional blocks and abutments being reversely disposed with reference to the position of the blocks $b$ and abutments $b^2$ (as clearly shown in Fig. 3). Thus, the outer detachable rim B may be used either right or left hand, as may be required, in the particular emergency or exigency.

I am aware that many modifications in detail may be resorted to, without affecting the spirit of the invention, and all such modifications as come within the scope of the appended claims, are within the purview of the invention, and constitute no departure therefrom.

Having thus fully described my invention, what I claim as new and desire to secure by Letters-Patent is:

1. In a wheel having an inner rim, a detachable outer rim, wedge-blocks carried on the outer surface of said inner rim, and each having a V-shaped nose, complementary blocks carried by the inner surface of said outer rim, and each having, at one end, a V-shaped notch engageable by one of said V-shaped noses, and means for locking the detachable rim in place.

2. In a wheel having an inner rim, a detachable outer rim, wedge-blocks carried on the outer surface of said inner rim, and each having a V-shaped, beveled nose, complementary blocks carried by the inner surface of said outer rim, and each having, at one end, a V-shaped notch engageable by one of said V-shaped noses, the walls of each notch being beveled, and means for locking the detachable rim in place.

3. In a wheel, an inner rim, wedge-blocks carried on the outer surface thereof and each having a V-shaped nose, a detachable outer rim, complementary blocks carried by the inner surface thereof, and each having, at one end, a V-shaped notch engageable by one of said V-shaped noses, and means for locking said blocks in coöperative engagement, with the nose of each of said wedge-blocks forced into the V-shaped notch of the corresponding notched block, said means comprising wedge-keys carried by the wheel, and means for locking the wedge-keys and, thus, the detachable rim against movement.

In testimony whereof I have hereunto set my hand in presence of two subscribing witnesses.

GEORGE E. KIPP.

Witnesses:
CHARLES F. KLINE,
CLARENCE E. MORRISON.